(12) United States Patent
Gao et al.

(10) Patent No.: US 11,151,309 B1
(45) Date of Patent: Oct. 19, 2021

(54) SCREENSHOT-BASED MEMOS

(71) Applicant: International Business Machines Corporation, Armonk, NY (US)

(72) Inventors: Lei Gao, Xian (CN); Xin Feng Zhu, Xian (CN); Kai Li, Xian (CN); A Peng Zhang, Xian (CN); Jia Xing Tang, Xian (CN); Jin Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/934,175

(22) Filed: Jul. 21, 2020

(51) Int. Cl.
| G06F 17/00 | (2019.01) |
| G06F 40/169 | (2020.01) |
| G06K 9/46 | (2006.01) |
| G06T 11/60 | (2006.01) |
| G06K 9/62 | (2006.01) |

(52) U.S. Cl.
CPC ......... *G06F 40/169* (2020.01); *G06K 9/4642* (2013.01); *G06K 9/6215* (2013.01); *G06T 11/60* (2013.01)

(58) Field of Classification Search
CPC .. G06F 40/169; G06K 9/4642; G06K 9/6215; G06T 11/60
See application file for complete search history.

(56) References Cited

U.S. PATENT DOCUMENTS

| 8,970,540 | B1 * | 3/2015 | Hebenstreit | ......... | G06F 15/0291 |
| | | | | | 345/174 |
| 9,582,482 | B1 * | 2/2017 | Sharifi | ..................... | G06F 9/451 |
| 9,779,389 | B2 * | 10/2017 | Thapliyal | ............... | G06Q 10/10 |
| 2008/0119235 | A1 * | 5/2008 | Nielsen | .................. | G06F 40/103 |
| | | | | | 455/566 |
| 2012/0144286 | A1 * | 6/2012 | Bank | ...................... | G06F 3/0308 |
| | | | | | 715/230 |
| 2013/0185657 | A1 * | 7/2013 | Gunawardena | ....... | G06F 40/169 |
| | | | | | 715/753 |

(Continued)

FOREIGN PATENT DOCUMENTS

| CN | 102830963 A | 12/2012 |
| CN | 101765840 B | 1/2013 |

OTHER PUBLICATIONS

Rasinec, Nino, "What Is Smart Screenshot?", Guideblocks, Nov. 29, 2017, 10 pages, <https://guideblocks.com/blog/knowledge-base-and-self-service/what-is-smart-screenshot.aspx>.

*Primary Examiner* — Laurie A Ries
(74) *Attorney, Agent, or Firm* — Gilbert Harmon, Jr.

(57) ABSTRACT

Embodiments of the present disclosure relate to screenshot-based memos. In an embodiment, a computer-implemented method is disclosed. The method comprises a monitoring displaying screen on a computing device for determining whether the displaying screen reaches a preset trigger condition. The method further comprises capturing a snapshot of the displaying screen in response to the displaying screen reaching the preset trigger condition. The method further comprises matching one or more screenshots comprised in one or more screenshot-based memos and the captured snapshot for obtaining a similarity degree. The method further comprises deploying the one or more screenshot-based memos on the displaying screen in response to the similarity degree meeting a preset similarity threshold. In other embodiments, a system and a computer program product are disclosed.

20 Claims, 9 Drawing Sheets

(56) References Cited

U.S. PATENT DOCUMENTS

| | | | |
|---|---|---|---|
| 2013/0262256 A1* | 10/2013 | Goldberg | G06Q 30/08 705/26.3 |
| 2014/0189576 A1* | 7/2014 | Carmi | G06K 9/6204 715/781 |
| 2014/0218385 A1* | 8/2014 | Carmi | G06T 7/136 345/590 |
| 2017/0046741 A1* | 2/2017 | Hunter | G06Q 30/0275 |
| 2017/0200018 A1* | 7/2017 | Boncha | G06Q 10/10 |
| 2017/0249970 A1 | 8/2017 | Loganathan | |
| 2018/0174288 A1* | 6/2018 | Kogan | G06K 9/00604 |
| 2019/0163351 A1* | 5/2019 | Jiang | G06F 40/169 |
| 2020/0159370 A1* | 5/2020 | Lees | G06K 9/6215 |

* cited by examiner

900

```
┌─────────────────────────────────────────────────┐
│ SEARCHING AT LEAST ONE OF THE ONE OR MORE        │
│ BACKGROUND SCREENSHOTS FROM THE ONE OR MORE      │
│ SCREENSHOT-BASED MEMOS                           │
│                      902                         │
└─────────────────────────────────────────────────┘
                        ↓
┌─────────────────────────────────────────────────┐
│ SPLITTING THE AT LEAST ONE OF THE BACKGROUND     │
│ SCREENSHOT INTO A PLURALITY OF CHILD SECTIONS,   │
│ WHEREIN THE PLURALITY OF CHILD SECTIONS EACH IS  │
│ ASSIGNED WITH A SECTIONAL WEIGHT VALUE IN        │
│ ACCORDANCE WITH A PREDEFINED MEASURING RULE      │
│                      904                         │
└─────────────────────────────────────────────────┘
                        ↓
┌─────────────────────────────────────────────────┐
│ MAPPING THE PLURALITY OF CHILD SECTIONS ONTO THE │
│ SNAPSHOT TO IDENTIFY A SET OF TARGET SECTIONS,   │
│ WHEREIN THE SET OF TARGET SECTIONS EACH IS THE   │
│ SAME AS A CORRESPONDING PART OF THE SNAPSHOT OF  │
│ THE DISPLAYING SCREEN                            │
│                      906                         │
└─────────────────────────────────────────────────┘
                        ↓
┌─────────────────────────────────────────────────┐
│ CALCULATING THE SIMILARITY DEGREE IN ACCORDANCE  │
│ WITH RATIO BETWEEN SUM OF SECTIONAL WEIGHT       │
│ VALUES OF THE TARGET SECTIONS AND SUM OF         │
│ SECTIONAL WEIGHT VALUES OF THE CHILD SECTIONS    │
│                      908                         │
└─────────────────────────────────────────────────┘
```

FIG. 9

SCREENSHOT-BASED MEMOS

BACKGROUND

The present disclosure relates to computer techniques, and more specifically, to a method, system and computer program product for screenshot-based memos.

In the usage of computing devices for daily applications, for example, working, learning or entertainment, people often need to write memos to record solutions after they resolve problems or add annotations with respect to some questions. There are many ways provided to generate memos by different memo application software on a computing device, such as writing textual type documents, obtaining image type screenshots or the like, and memos are stored on a hard disk in a computing device. If there are massive memos generated and managed by a memo application, the efficiency of searching memos might be a big challenge, especially when contents of memos are not well organized. Furthermore, if people use multiple memo applications to generate and manage memos at the same time, it is sometimes difficult to decide which one of memo applications should be used. Accordingly, there is a need to address the aforementioned problems on memos in a computing device.

SUMMARY

According to some embodiments of the present disclosure, there is provided a method, system and computer program product for deploying screenshot-based memos on a computing device.

According to one or more embodiments of the present disclosure, the present disclosure provides a computer-implemented method. The method comprises monitoring a displaying screen on a computing device for determining whether the displaying screen reaches a preset trigger condition. The method further comprises capturing a snapshot of the displaying screen in response to the displaying screen reaching the preset trigger condition. The method further comprises matching one or more screenshots comprised in one or more screenshot-based memos and the captured snapshot for obtaining a similarity degree. The method further comprises deploying the one or more screenshot-based memos on the displaying screen in response to the similarity degree meeting a preset similarity threshold.

According to one or more embodiments of the present disclosure, the present disclosure provides a system. The system comprises at least one processing unit and a memory coupled to the at least one processing unit and storing instructions thereon. The instructions, when executed by the at least one processing unit, perform acts which comprise monitoring a displaying screen on a computing device for determining whether the displaying screen reaches a preset trigger condition. The acts further comprise capturing a snapshot of the displaying screen in response to the displaying screen reaching the preset trigger condition. The acts further comprise matching one or more screenshots comprised in one or more screenshot-based memos and the captured snapshot of the displaying screen for obtaining a similarity degree. The acts further comprise deploying the one or more screenshot-based memos on the displaying screen in response to the similarity degree meeting a preset similarity threshold.

According to one or more embodiments of the present disclosure, the present disclosure provides a computer program product. The computer program product comprises a computer readable storage medium having program instructions embodied therewith. The program instructions are executable by an electronic device to cause the electronic device to perform acts which comprise monitoring a displaying screen on a computing device for determining whether the displaying screen reaches a preset trigger condition. The acts further comprise capturing a snapshot of the displaying screen in response to the displaying screen reaching the preset trigger condition. The acts further comprise matching one or more screenshots comprised in one or more screenshot-based memos and the captured snapshot of the displaying screen for obtaining a similarity degree. The acts further comprise deploying the one or more screenshot-based memos on the displaying screen in response to the similarity degree meeting a preset similarity threshold.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 9 depicts a flow chart illustrating an exemplary method for screenshot-based memos to match the one or more screenshot-based memos and a snapshot of a displaying screen for obtaining a similarity degree according to some embodiments of the present disclosure.

DETAILED DESCRIPTION

Figure 1:
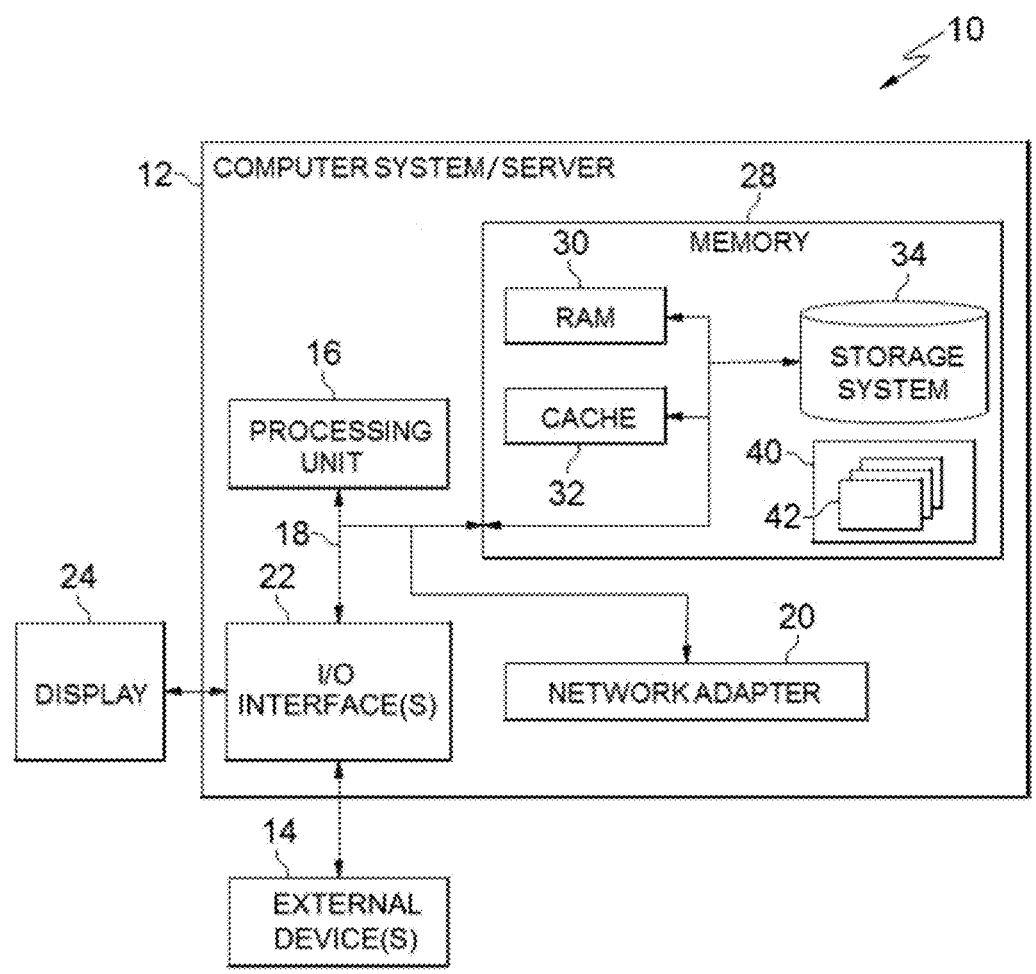
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the disclosure.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
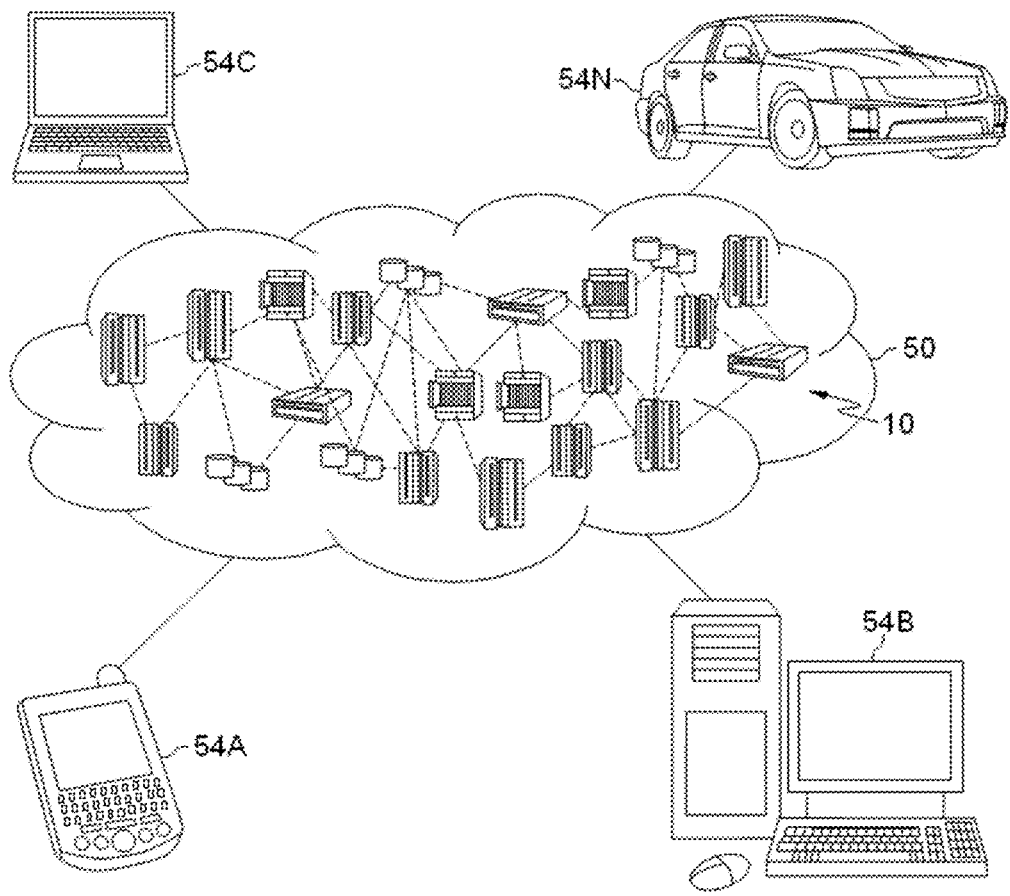
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
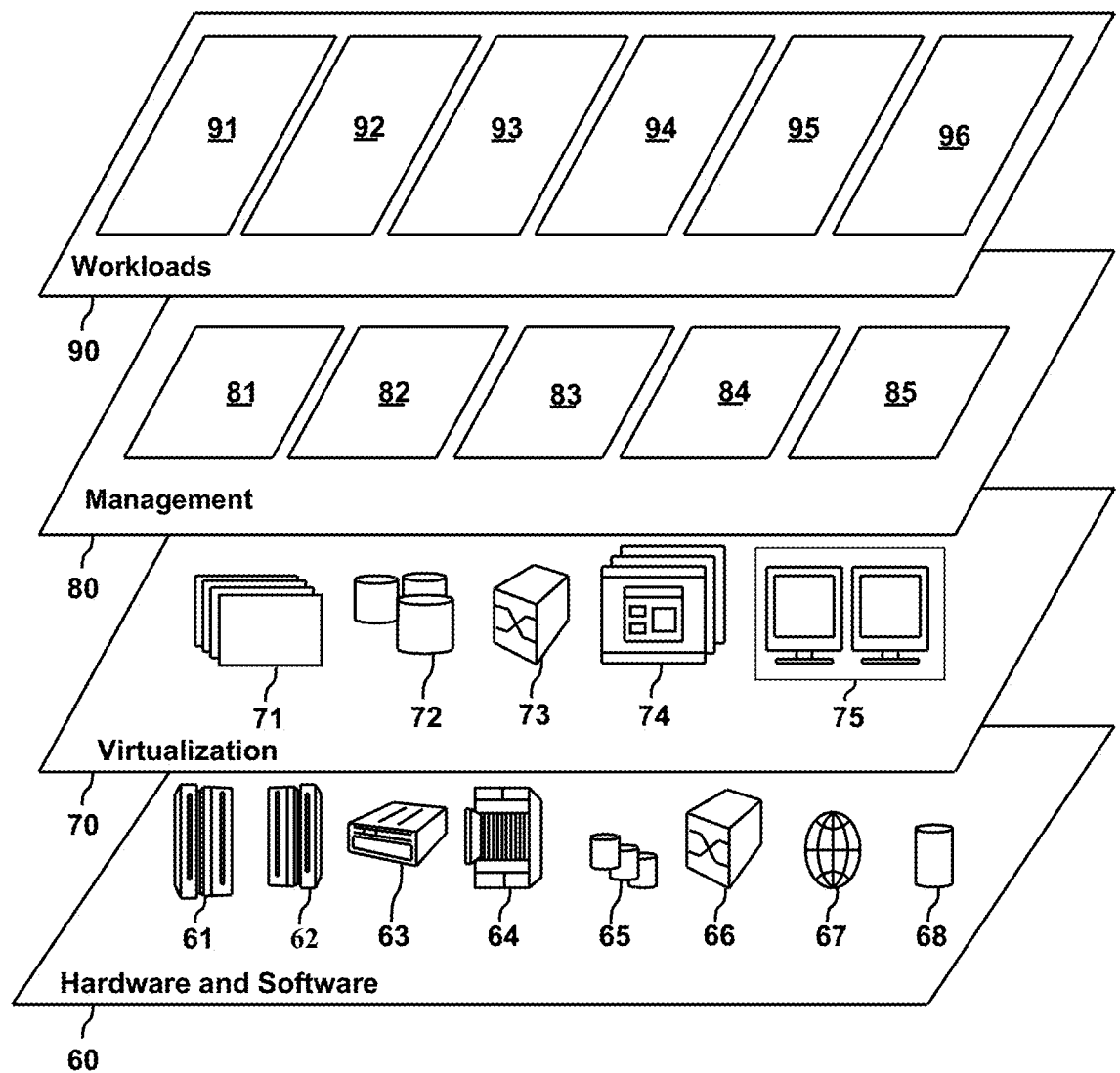
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memos based on screenshots 96. The functionalities of memos based on screenshots 96 will be described in the following embodiment of the present disclosure.

Figure 4:
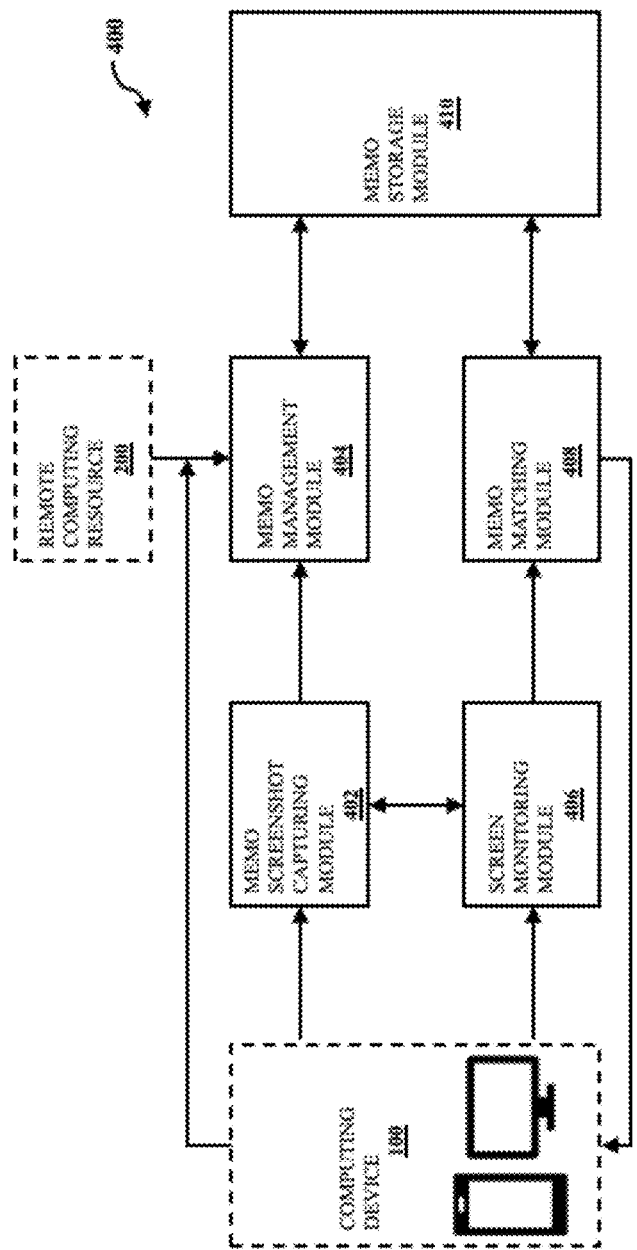
FIG. 4 depicts a block diagram illustrating a memo system according to some embodiments of the present disclosure.

As mentioned above, screenshot-based memos can be used to generate, manage and deploy memos on a computing device on the basis of a memo system. FIG. 4 depicts a block diagram illustrating a memo system 400 according to some embodiments of the present disclosure. It should be recognized that number and arrangement of elements or modules in FIG. 4 are provided for the purpose of illustration only. The memo system 400 may include more and/or different elements or modules and different arrangements.

According to one embodiment of the present disclosure, a memo system 400 is provided to implement a computer-implemented method for screenshot-based memos which will be described in the present disclosure. The memo system 400 includes memo screenshot capturing module 402, memo management module 404, screen monitoring module 406, memo matching module 408 and memo storage module 410. Notwithstanding, the memo system 400 depicted in FIG. 4 comprising the mentioned modules, there is not a limitation to modules or elements comprised in the memo system. The memo system 400 can include other modules or elements for implementing more functionalities and objectives in accordance with various user requirements and experiences, for example, a symbol library for providing annotations associating service, an online dictionary module for providing translation service or an image edition module for providing image modification functionality.

In some embodiments, the memo system 400 is deployed on a computing device 100, for example, a desktop computer, a laptop, a smart phone or the like, which can implement the memo system 400 by components of the computing device comprising hardware, software or their combinations thereof. According to performance and capability based on the computing device, the memo system 400 can perform the computer-implemented method for screenshot-based memos which will be described in the present disclosure.

In some embodiments of the present disclosure, a part of the memo system 400 may be deployed on remote computing platforms, for example, a cloud computing platform and/or a cloud storage service system which can provide remote computing resource 200 to implement a part of functionalities of the memo system 400 and provide respective information source or supporting services, for example, a remote annotation library for providing reference to memos or massive remote storage space for maintaining memos. In these embodiments, the remote computing platforms would be resilient and easily adapted to increased computing performance, storage capacity, response speed, display effect and the like in accordance with user requirements.

The memo screenshot capturing module 402 may also be referred to as memo screen snapshotting module or memo screenshot generating module. A screenshot is a captured image file which comprises all images and/or text information displayed on a screen of a computing device at a specific time point. The memo screenshot capturing module 402 can capture images and/or texts displayed on a screen of computing device 100 to obtain one or more screenshots for generating memos related to the current screen. In one embodiment, the memo screenshot capturing module 402 can accordingly execute acts of capturing screenshots in response to user instructions or other inputting, for example, a click act on a button which may be a virtual key/button displayed on the screen or a physical key/button in the computing device. In another embodiment, the memo screenshot capturing module 402 can autonomously execute acts of capturing screenshot in accordance with a program or rule, for example, capturing images and/or texts displayed on a screen after a specific time interval to obtain the screenshots. It should be appreciated that appropriate image/screen capturing techniques in the art can be used to implement the memo screenshot capturing module 402.

The memo management module 404 can also be referred to as memo generation and management module. The memo management module 404 can, in accordance with user requirements, system performance or other conditions, process the screenshots captured by the memo screenshot capturing module 402 and generate screenshot-based memos based on the processed screenshots. In some embodiments, the memo management module 404 can process the screenshots to obtain background screenshots in accordance with user requirements, for example, resizing the image size of the screenshots, adjusting colors and/or brightness of the screenshots, editing the screenshots or the like. A background screenshot is a basic image file comprised in a screenshot-based memo, and the screenshot-based memo is generated based on the background screenshot by means of associating annotations with the background screenshot. In furthermore embodiments of the present disclosure, the memo management module 404 can associate annotations with the background screenshots in accordance with user requirements or a specific program. The annotations can be textual type information to record related information, for example, words or sentences to explain functionalities of an object, an address of an interested place, solution plans for problems or the like. The annotations can be image type information to record related information, for example, graphical symbols associated with emphasized contents, head shots of contacts, pictures for scenic points and the like. The annotations can be other available type information to record related information, for example, sounds, videos, application programs and website links etc. According to embodiments of the present disclosure, the screen-based memos based on screenshots can be generated based on the background screenshots with the annotations, for example, textual type information, image type information, other available type information or combinations of the aforementioned information types. According to a yet further embodiment of the present disclosure, the memo management module 404 can store the screenshot-based memos, which are generated based on the background screenshots and the annotations, on a storage device for maintaining the screen-based memos. In addition to the previously described functionalities performed by the memo management module 404, the screen-based memos can be managed, for example, by an application interface receiving instructions and interacting with a user to execute management operations, for example, creating, copying, deleting, sorting, merging, moving or other file management operations. The management operations can be input into the memo management module by the user.

In one embodiment of the present disclosure depicted in FIG. 4, a storage module/device for storing the screen-based memos are referred to as memo storage module 410. Memo storage module 410 may be local storage devices in the computing device 100, for example, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk or the like. Memo storage module 410 may be a remote storage device connected with and allocated to the computing device 100 through compatible connection ways, for example, a network hard disk, a cloud storage service system, a Peer to Peer storage system, or the like. The screen-based memos can be stored on the memo storage module 410 in normal or compressed file situation. In some embodiments of the present disclosure, the remote computing resource 200 can be compatible to provide the remote storage resource or service to perform functionalities of the memo storage module 410.

The screen monitoring module 406 can monitor a displaying screen on the computing device 100 for determining whether the current situation of the displaying screen reaches a preset trigger condition. In one embodiment of the present disclosure, the current situation of the displaying screen can be whether the displaying screen is held to steadily display previously selected contents which are selected in accordance with inputted instructions at a previous time point by a user, and the preset trigger condition is a time threshold. The time threshold can be a preset duration time in which contents displayed on the displaying screen remains unchanged. If the displaying screen is held to steadily display the previously selected contents which remain unchanged during the preset duration time, the displaying screen reaches the time threshold which is the preset trigger condition. In another embodiment of the present disclosure, the current situation of the displaying screen can be that the displaying screen is held to steadily display previously selected contents which are selected in accordance with inputted instructions at a previous time point, and the preset trigger condition is receiving a preset activated instruction from an external environment, for example, a click act on a real or virtual button by a user to activate the computer device 100 to prepare memos for the user. If the displaying screen is held to steadily display the previously selected contents and receives the activated instruction from the external environment at the time point, the displaying screen reaches the preset trigger condition. It should be noted that types or mechanisms corresponding to the current situation of the displaying screen and the preset trigger condition are not limited by the aforementioned embodiments of the present disclosure, and appropriate types or mechanisms which could implement approximately the same technical effect with the aforementioned embodiments of the present disclosure can be used in the present disclosure.

In some embodiments of the present disclosure, in response to the screen monitoring module 406 detecting the displaying screen reaching a preset trigger condition during monitoring process, the memo system 400 captures a snapshot of the displaying screen, for example, the screen monitoring module 406 is triggered to capture the snapshot of the displaying screen in response to the screen monitoring module 406 detecting the displaying screen is held to steadily display the previously selected contents during the preset duration time in the process of monitoring.

In one embodiment of the present disclosure, the screen monitoring module 406 can snapshot the displaying screen in response to the screen monitoring module 406 being triggered to capture the snapshot of the displaying screen.

In another embodiment of the present disclosure, the screen monitoring module 406 can send one or more instructions to the memo screenshot capturing module 402 in response to the screen monitoring module 406 being triggered for determining the displaying screen reaches a preset trigger condition. Furthermore, the memo screenshot capturing module 402 can capture the displaying screen for obtaining the snapshot of the displaying screen based on the one or more snapshot instructions, and can send the snapshot of the displaying screen to the screen monitoring module 406 or the memo matching module 408.

As shown in FIG. 4, memo matching module 408 can match the screenshots comprised in the screen-based memos stored in the memo storage module 410 and the captured snapshot to obtain a similarity degree between the screenshots and the captured snapshot. In one embodiment of the present disclosure, the memo matching module 408 can search at least one of the background screenshots from the screen-based memos and split the at least one of the background screenshots into a plurality of child sections. Then the plurality of child sections can be assigned sectional weight values in accordance with a predefined measuring rule. Furthermore, the memo matching module 408 can map the plurality of child sections onto the captured snapshot of the displaying screen to identify a set of target sections from the plurality of child sections, wherein each of the set of target sections is the same as a corresponding part of the captured snapshot. The memo matching module 408 can calculate the similarity degree in accordance with a ratio between a sum of sectional weight values of the set of target sections and a sum of sectional weight values of the plurality of child sections. In response to the similarity degree being equal to or greater than a preset similarity threshold, the memo matching module 408 can deploy the screen-based memos comprising the at least one of the background screenshots on the displaying screen for displaying the screen-based memos together with content being displayed on the displaying screen.

In some embodiments of the present disclosure, the memo matching module 408 can traverse the screen-based memos stored in the memo storage module 410 to match the screenshots comprised in the screen-based memos and the snapshot of the displaying screen for obtaining similarity degrees between each of the screenshots and the snapshot of the displaying screen. If one of the memos are determined to have a similarity degree which meets a preset similarity threshold, the one of the memos can be deployed on the displaying screen. In accordance with the similarity degrees, the screen-based memos which have similarity degrees equal to or more than the preset similarity threshold can be deployed on the displaying screen.

In some embodiments of the present disclosure, the memo matching module 408 can deploy one or more memos on the displaying screen, for example, the one or more memos comprising screenshots which have similarity degrees corresponding to a snapshot of the displaying screen equal to or greater than a preset similarity threshold. The memo matching module 408 matches the screenshots comprised in the screen-based memos, for example, the screen-based memos stored in the memo storage module 410, to the snapshot of the displaying screen to determine a similarity degree between the screenshots and the snapshot of the displaying screen. The screen-based memos can comprise a set of elements, for example, background screenshots in accordance with the screenshots, textual type information, image type information, sounds, videos, website links, virtual keys or buttons, online applications and the like. In one embodiment of the present disclosure, the screen-based memos can be deployed on one or more new rendering layers covered on original contents displayed on the displaying screen. In other embodiments, the screen-based memos can be deployed on the displaying screen by means of merging the screen-based memos into the original contents displayed on the displaying screen.

It should be noted that the system of screenshot-based memos referred to as the memo system 400 according to embodiments of this disclosure can be implemented by computer system/server 12 of FIG. 1, and herein the system of screenshot-based memos is exemplary and abstractly illustrated by the block diagram of the memo system 400 which does not explicitly exhaust or precisely limit, either entirely or by components of the system, screenshot-based memos as shown in FIG. 4.

Figure 5:
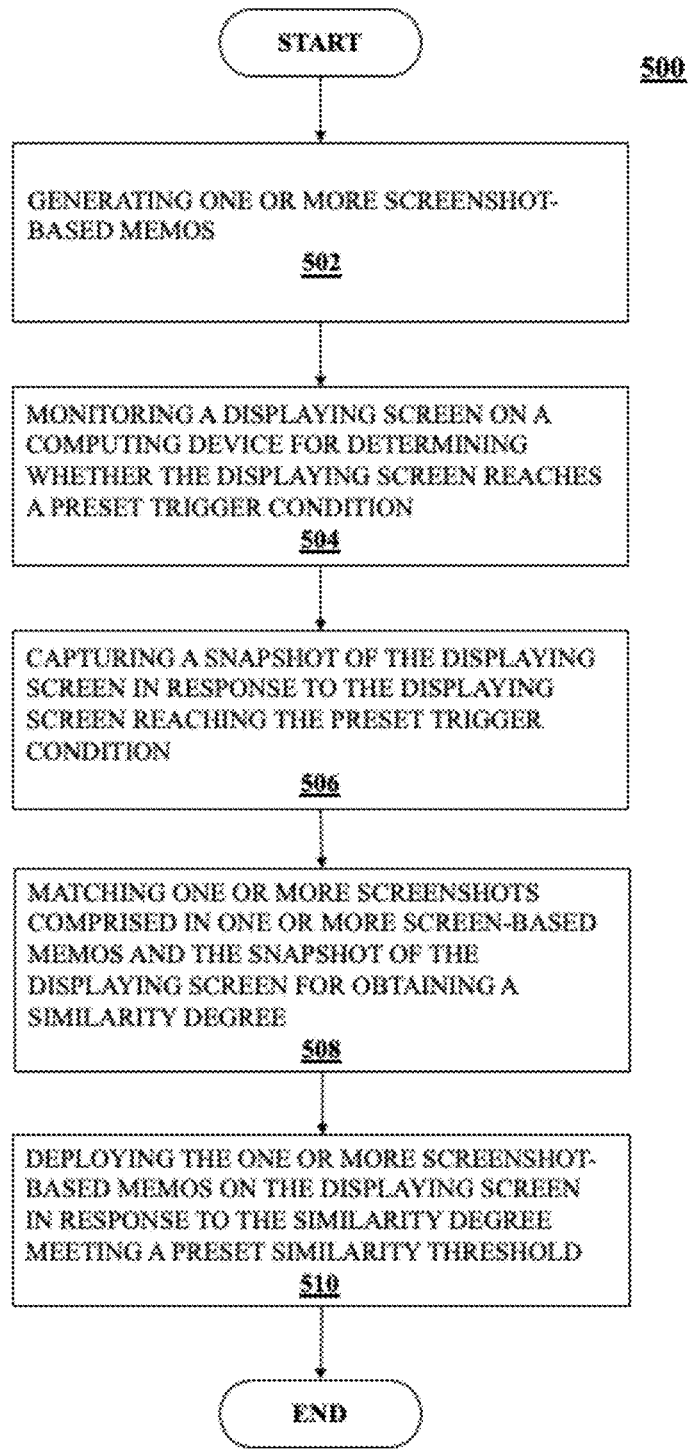
FIG. 5 depicts a flow chart illustrating an exemplary method for screenshot-based memos according to some embodiments of the present disclosure.

With reference now to FIG. 5, in which a process flow chart 500 of a method for screenshot-based memos is depicted according to embodiments of the present disclosure. For example, the process flow chart 500 is a correlated sampling implemented by the memo system 400 described herein in regard to generating and deploying memos on a displaying screen on a computing device by means of one or more processors in the computing device, for example, a desktop computer, a laptop, a smart phone, a PDA (Personal Digital Assistant) or a tablet, etc.

At step 502, the memo system 400 generates one or more memos based on one or more screenshots. In some embodiments, the memo system 400 can capture images and/or texts displayed on a screen in the computing device to obtain one or more screenshots for generating memos related to the screen. The memo system 400 can accordingly execute acts for capturing screenshots in response to user instructions or other inputting, for example, a clicking act on a button which is a virtual key/button displayed on the screen or a physical key/button in the computing device. The memo system 400 can autonomously execute acts for capturing screenshots in accordance with a program or rule, for example, capturing screen after a specific time interval to obtain the screenshots. It should be noted that step 502 is not an indispensable step in the method for screenshot-based memos shown in FIG. 5. In some embodiments, the screenshot-based memos can be generated in a standalone step or process which is not comprised in the method for screenshot-based memos or in a step comprised in the method for screenshot-based memos with a different timing sequence.

At step 504, the memo system 400 monitors a displaying screen on a computing device for determining whether the displaying screen reaches a preset trigger condition. The memo system 400 continuously or intermittently monitors a displaying screen on the computing device for detecting whether conditions of the displaying screen reaches a preset trigger condition. In some embodiments of the present disclosure, the conditions of the displaying screen can be whether the displaying screen is held to steadily display previously selected contents, for example, the contents are selected in accordance with inputted instructions at a previous time point by user, and the preset trigger condition is a time threshold in accordance with a preset duration time. In some embodiments of the present disclosure, the situation of the displaying screen is whether the displaying screen is held to steadily display previously selected contents, for example, the contents are selected in accordance with inputted instructions at a previous time point from external environment, for example, the instructions are inputted by user, and the preset trigger condition is the memo system 400 receiving a specific activation instruction from the external environment, for example, a click act on a real or virtual key/button by user to activate the computer device to prepare use of memos.

At step 506, the memo system 400 can capture a snapshot of the displaying screen in response to the displaying screen reaching the preset trigger condition. In one embodiment, if the displaying screen is held to steadily display the previously selected contents during the whole preset duration time, it determines the displaying screen reaches the preset trigger condition. In another embodiment, the preset trigger condition is the memo system 400 receiving an activation instruction from external environment, for example, a click act on a real or virtual key/button by user to activate the computer device to prepare use of memos. If the displaying screen is held to steadily display the previously selected contents and receives the activation instruction from the external environment at a time point, the memo system 400 can determine the displaying screen reaches the preset trigger condition. In response to the displaying screen reaching the preset trigger condition during the monitoring process, the memo system 400 can capture a snapshot of the displaying screen.

At step 508, the memo system 400 can match one or more screenshots comprised in one or more screenshot-based memos and the snapshot of the displaying screen for obtaining a similarity degree between the one or more screenshot-based memos and the snapshot of the displaying screen. In some embodiments of the present disclosure, the memo system 400 can traverse the screen-based memos stored in the memo system 400 or storage devices corresponding to remote computing resources to match the screenshots comprised in the screen-based memos and the snapshot of the displaying screen for obtaining similarity degrees between each of the screenshots and the snapshot of the displaying screen. If one of the memos are determined to have a similarity degree which is equal to or greater than a preset similarity threshold, the one of the memos will be deployed on the displaying screen. In some embodiments, the screen-based memos which have similarity degrees equal to or greater than the preset similarity threshold can be deployed on the displaying screen in accordance with the similarity degrees obtained at step 508.

At step 510, the memo system 400 deploys one or more memos on the displaying screen in response to the similarity degree meeting a preset similarity threshold. The one or more memos comprise screenshots which have similarity degrees corresponding to the snapshot of the displaying screen being equal to or more than the preset similarity threshold, are deployed on the displaying screen. The one or more memos may comprise a set of elements, for example, background screenshots in accordance with the screenshots, textual type information, image type information, sounds, videos, website links, virtual keys or buttons, online applications and the like. In one embodiment, the screen-based memos can be deployed on one or more new rendering layers covered on original contents displayed on the displaying screen. In other embodiments, the screen-based memos can be deployed on the displaying screen by means of merging the screen-based memos into the original contents displayed on the displaying screen.

It should be noted that the processing of screenshot-based memos by the memo system 400 according to embodiments of this disclosure can be implemented by computer system/ server 12 of FIG. 1, and herein the processing of screenshot-based memos is exemplarily and abstractly illustrated by the process flow chart 500 which does not explicitly exhaust or precisely limit, either entirely or by components of the method, screenshot-based memos as shown in FIG. 5.

Figure 6:
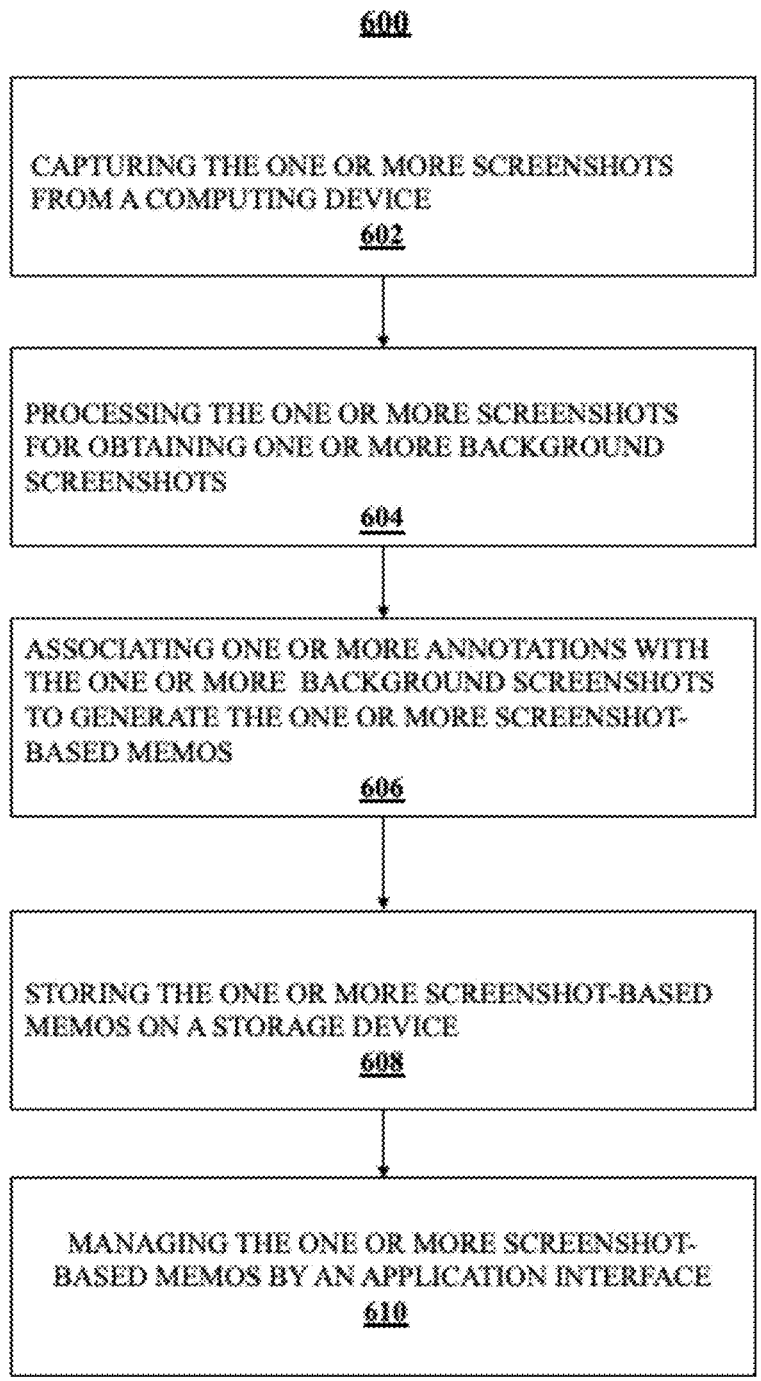
FIG. 6 depicts a flow chart illustrating an exemplary method for screenshot-based memos to generate one or more screenshot-based memos according to some embodiments of the present disclosure.

With reference now to FIG. 6, in which a flow chart 600 of an exemplary method for screenshot-based memos to generate one or more memos based on one or more screenshots is depicted according to embodiments of the present disclosure. The exemplary method depicted by the flow chart 600 can be implemented by memo system 400 as shown in FIG. 4 and comprised in the method for screenshot-based memos as shown in FIG. 5.

At step 602, the memo system 400 can capture one or more screenshots from a computing device. The memo system 400 can capture images and/or texts displayed on a screen in a computing device to obtain one or more screenshots for generating memos related to the current screen. In one embodiment, the memo system 400 can accordingly execute acts for capturing screenshots in response to user instructions or other inputting, for example, a click act on a key/button which may be a virtual key/button displayed on the screen or a physical key/button in a computing device. In another embodiment, the memo system 400 can autonomously execute acts for capturing screenshot in accordance with a program or rule, for example, capturing screen after a specific time interval to obtain the screenshots.

At step 604, the memo system 400 can process the one or more screenshots for obtaining one or more background screenshots. In some embodiments, the memo system 400 can process the screenshots to obtain background screenshots in accordance with user requirements, for example, cutting a part of the screenshots based on user requirements, resizing the image size of the screenshots appointed by user, adjusting the color and/or brightness of the screenshots based on user requirements and the like. In some embodiments, the memo system 400 can autonomously process the screenshots to obtain background screenshots in accordance with user requirements and/or in accordance with a specific program.

At step 606, the memo system 400 can associate one or more annotations with the one or more background screenshots for obtaining the one or more memos. The memo system 400 can associate, for example, mark, draw, link etc., the one or more annotations with the one or more background screenshots in accordance with user requirements or a specific program. The one or more annotations can be textual type information to record related information, for example, words or sentences to explain functionalities of an object, an address of an interested place, solution plans for problems or the like. The one or more annotations can be image type information to record related information, for example, graphical symbols associated with emphasized content, head shots of contacts, pictures for scene points or the like. The one or more annotations can be other available type information to record related information, for example, sounds, videos, application programs, website links, etc. According to embodiments of the present disclosure, the screenshot-based memos can be generated based on the background screenshots with textual type information, image type information, other available type information and combinations of the aforementioned information types.

At step 608, the memo system 400 can store the one or more memos on a storage device. In some embodiments, the memo system 400 can store the one or more memos on a local storage device in a computing device. In some embodiments, the memo system 400 can store the one or more memos on remote storage devices which are connected with and allocated to the computing device. The screen-based memos can be stored on the storage device in normal or compressed format.

At step 610, the memo system 400 can manage the one or more memos by an application interface. In accordance with user requirements, the one or more memos can be managed with a management application. The management application can deploy an interface which can be interactively operated by a user and precede management operations in accordance with instructions received form external environment.

Figures 7, 8:
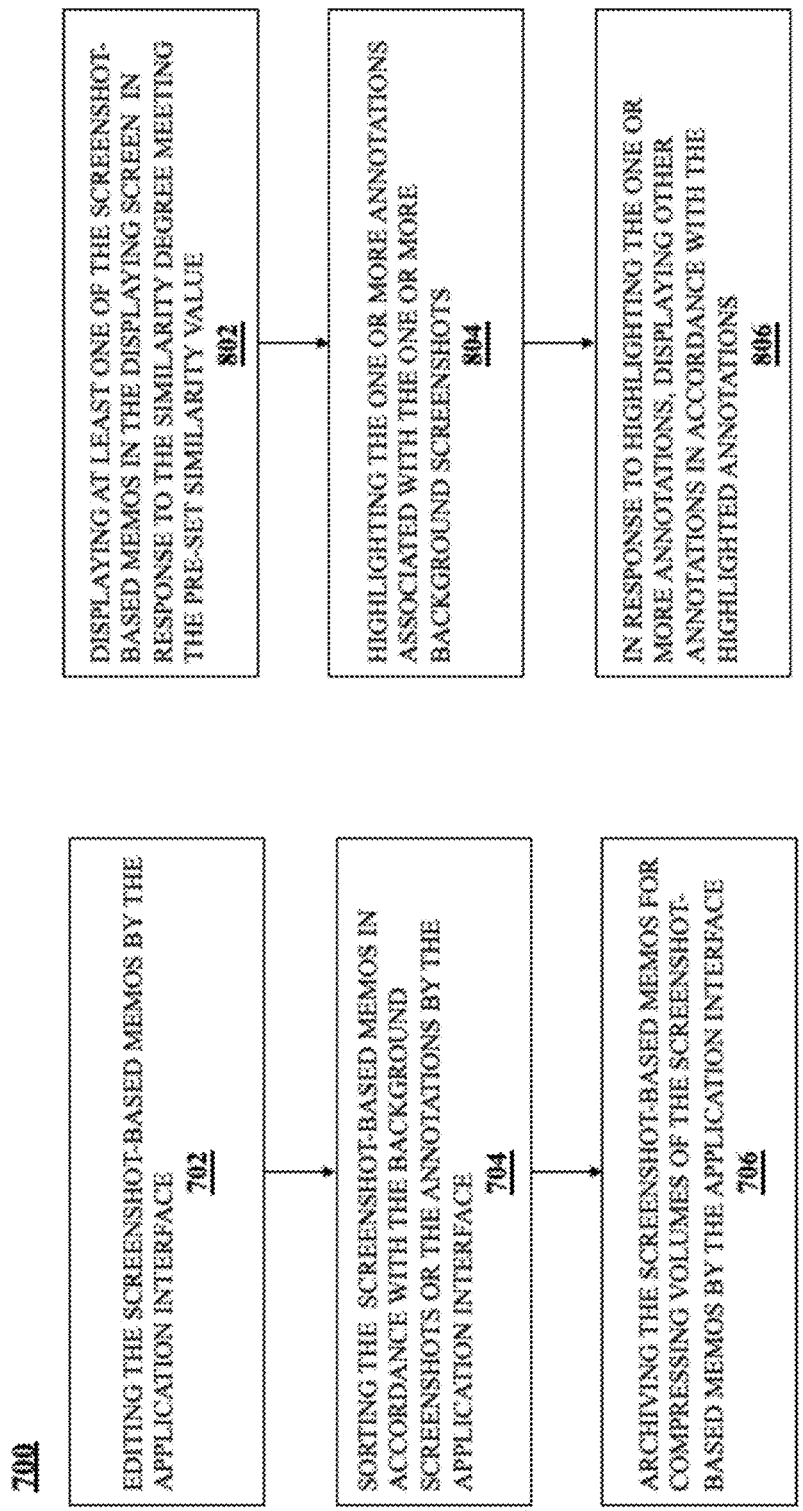
FIG. 7 depicts a flow chart illustrating an exemplary method for screenshot-based memos to manage the one or more screenshot-based memos according to some embodiments of the present disclosure.
FIG. 8 depicts a flow chart illustrating an exemplary method for screenshot-based memos to deploy the one or more screenshot-based memos on a displaying screen according to some embodiments of the present disclosure.

With reference now to FIG. 7, in which a flow chart 700 of an exemplary method for screenshot-based memos to manage one or more memos by an application interface is depicted according to embodiments of the present disclosure. The exemplary method depicted by the flow chart 700 can be implemented by memo system 400 as shown in FIG. 4 and comprised in the method for screenshot-based memos as shown in FIG. 5.

At step 702, the memo system 400 can edit one or more memos which can comprise one or more annotations by the application interface. In embodiments of the present disclosure, memos can comprise one or more background screenshots and a set of annotation elements. The memo system 400 can edit the background screenshots, for example, resizing the background screenshots, readjusting the colors and/or brightness of the background screenshots or the like, in accordance with user requirements and/or a preset program. Further, the memo system 400 can edit the set of annotation elements in accordance with user requirements and/or a preset program, for example, adding or deleting annotations, amending words or sentences in textual type information comprised in annotations, redrawing or adjusting images or symbols in image type information comprised in annotations, editing sounds and/or videos comprised in annotations, etc. The user requirements can be received by the application interface and inputted into the memo system 400.

At step 704, the memo system 400 can sort the one or more memos in accordance with the one or more background screenshots and/or the one or more annotations by the application interface. The one or more memos can be sorted in accordance with user requirements which are received by the application interface and/or preset programs associated with the memo system 400. In some embodiments, the one or more memos can be sorted in accordance with characters of the one or more background screenshots, for example, the same sizes of the background screenshots and/or specific generating times when the background screenshots are generated. The screen-based memos which can have the same sizes of the background screenshots and/or same generating times when the background screenshots are generated can generally imply that the screen-based memos aim at the same objectives and are related to each other. In other embodiments, the one or more memos can be sorted in accordance with characters of the one or more annotations, for example, the similar words or sentences comprised in annotations or adjacent positions of annotations associated with background screenshots which generally indicate the same objectives can require annotation.

At step 706, the memo system 400 can archive the one or more memos for compressing volumes of the one or more memos by the application interface. The one or more memos, which can be edited and sorted, can be archived for compressing volumes of the one or more memos. Notwithstanding that the performance profile is significantly increased in modern computing device/system, it is noted that compressing file volumes of massive memos stored in storage devices is realized by the memo system 400 to save storage spaces and/or increase transmission rate through the network.

With reference now to FIG. 8, in which a flow chart 800 of an exemplary method for screenshot-based memos to deploy one or more memos on a displaying screen is depicted according to embodiments of the present disclosure. The exemplary method depicted by the flow chart 800 can be implemented by memo system 400 as shown in FIG. 4 and comprised in the process flow chart 500 as shown in FIG. 5.

At step 802, the memo system 400 can display at least one of the one or more memos in the displaying screen in response to the similarity degree meeting the preset similarity threshold. When the memo system 400 detects the similarity degree is equal to or greater than the preset similarity threshold, the memo system 400 can display at least one of the one or more memos in the displaying screen at the time. In some embodiments, the memo system 400 can display multiple memos of the one or more memos in the displaying screen at the same time in accordance with user requirements and/or preset programs, for example, the multiple memos sorted into the same category can be displayed on the displaying screen at the same time. The screen-based memos can comprise a set of elements, for example, background screenshots in accordance with the screenshots, textual type information, image type information, sounds, videos, website address links, virtual keys or buttons, online applications and the like. In some embodiments, the screen-based memos can be deployed on one or more new rendering layers covered on original content displayed on the displaying screen. In other embodiments, the screen-based memos can be deployed on the displaying screen by merging the screen-based memos into the original content displayed on the displaying screen.

At step 804, the memo system 400 can highlight the one or more annotations associated with the one or more background screenshots comprised in the at least one of the one or more memos. The memo system 400 can highlight the one or more annotations associated with the one or more background screenshots comprised in the at least one of the one or more memos in response to selections from user and/or preset rules in accordance with programs associated with the memo system 400.

At step 806, the memo system 400 can display other annotations in accordance with the highlighted annotations in response to highlighting the one or more annotations. In one embodiment, the memo system 400 can display other annotations related to the selected annotations which are selected by users, other external inputting selection and/or preset selection rules inside the memo system 400. The relationship among the annotations can be determined in accordance with characters of the annotations, for example, the annotations sorted into the same category as the selected annotations and determined to aim at the same objectives as the selected annotations can be displayed as well as the highlighted annotations.

With reference now to FIG. 9, in which a flow chart 900 of an exemplary method for screenshot-based memos to match one or more screenshots comprised in the one or more screenshot-based memos and the snapshot of the displaying screen for obtaining a similarity degree is depicted according to embodiments of the present disclosure. The exemplary method depicted by the flow chart 900 can be implemented by memo system 400 as shown in FIG. 4 and comprised in process flow chart 500 for screenshot-based memos as shown in FIG. 5.

At step 902, the memo system 400 can search at least one of the one or more background screenshots from the one or more screenshot-based memos.

At step 904, the memo system 400 can split the at least one of the one or more background screenshots into a plurality of child sections, and the plurality of child sections can be assigned sectional weight values in accordance with a predefined measuring rule.

At step 906, the memo system 400 can map the plurality of child sections onto the snapshot of the displaying screen to identify a set of target sections from the plurality of child sections, and the set of target sections can be the same as corresponding parts of the snapshot of the displaying screen.

At step 908, the memo system 400 can calculate the similarity degree in accordance with the ratio between the sum of sectional weight values of the set of target sections and the sum of sectional weight values of the plurality of child sections.

Figure 10:
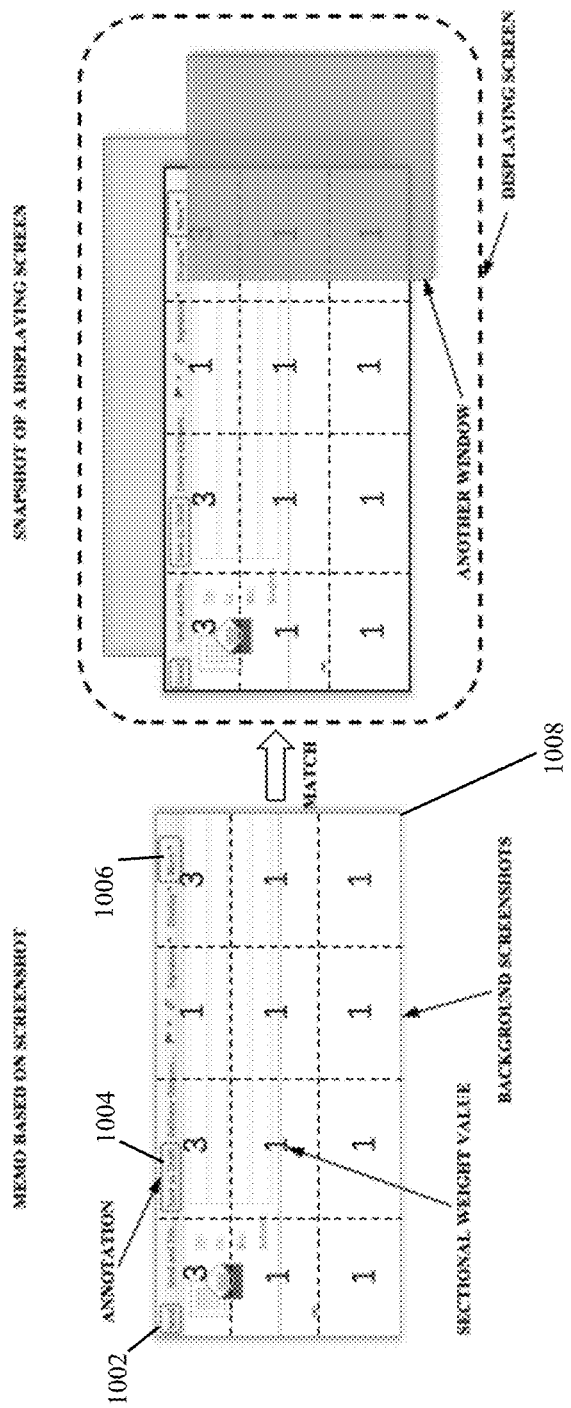
FIG. 10 depicts an exemplary embodiment illustrating how to match the one or more screenshot-based memos and the snapshot of the displaying screen for obtaining a similarity degree according to the present disclosure.

With reference now to FIG. 10, in which an exemplary embodiment illustrating how to match the one or more screenshots comprised in the one or more memos and the snapshot of the displaying screen for obtaining a similarity degree is depicted according to the exemplary method shown in FIG. 9.

As shown in FIG. 10, a screenshot-based memos with respect to, for example, an email application software, is illustrated, herein the memo comprises an exemplary background screenshot 1008 which is captured, for example, from an interface of an email application software displayed on a screen in a computing device, and three annotations depicted as rectangles respectively surrounding and emphasizing three operational buttons, such as "Send" 1002, "Save as Draft" 1004 and "More" 1006 buttons, which are associated with the exemplary background screenshot 1008 for annotating important characters or functions in regard to the email application software.

As previously mentioned, the memo system 400 searches at least one of the one or more background screenshots from the one or more memos. The exemplary background screenshot 1008 shown in FIG. 10 is searched from the one or more memos in regard to the email application software.

In an embodiment of the present disclosure, the memo system 400 can search the exemplary background screenshot 1008 based on file features of background screenshots, for example, name of the exemplary background screenshot 1008 or the corresponding memo including some key words corresponding to name of the email application software.

Furthermore, the memo system 400 splits the exemplary background screenshot 1008 into a 4×3 grid of child sections. The 4*3 child sections can be assigned sectional weight values in accordance with a predefined measuring rule, for example, the child section associated with one annotation is assigned a higher sectional weight value, e.g., 3, than the child section associated with no annotation, assigned a sectional weight value of, e.g., 1. In some embodiments, if a child section is associated with more than one annotation, the child section can be assigned a higher weight value, e.g., 4, 5, or higher values, than the child section associated with one annotation which is assigned a sectional weight value of 3. Accordingly, the predefined measuring rule can be child sections comprising a quantity of annotations assigned higher sectional weight values than child sections comprising less annotations. In other embodiments, the child sections comprise the same quantity of annotations, for example, child sections without annotation, as shown in FIG. 10, can be assigned the same sectional weight value of 1.

Furthermore, the memo system 400 can map the 4×3 grid of child sections onto a snapshot comprising a running interface of the email application software displayed on a displaying screen.

As shown in FIG. 10, the running interface of the email application software in the snapshot is partially blocked by another window, for example, three child sections on the right side of the running interface are blocked by a window for another application software. As a result, a set of target sections from the 4×3 child sections, for example, 3×3 target sections, is identified by mapping the 4×3 child sections onto a snapshot in accordance with the set of target sections being the same as a corresponding part of the snapshot of the displaying screen, for example, a part of the running interface of the email application software comprised in the snapshot of the displaying screen as shown in FIG. 10.

According to the set of target sections, the memo system 400 can calculate a similarity degree in accordance with ratio between the sum of sectional weight values of the set of target sections and the sum of sectional weight values of the child sections as:

$$\text{Similarity} = \frac{\text{Sum of Target Sections}}{\sum_{i=1}^{n} w_i}$$

Similarity is the similarity degree;

Sum of Target Sections is the sum of sectional weight values of the set of target sections;

n is number of the child sections;

$w_i$ is sectional weight value of one child section.

As shown in FIG. 10, the 4×3 grid of child sections comprises 12 child sections which are respectively assigned with sectional weight values as 3, 3, 1, 3, 1, 1, 1, 1, 1, 1, 1 and 1. Thereof, the sum of sectional weight values of the child sections is calculated as:

$$\sum_{i=1}^{12} w_i = 3+3+1+3+1+1+1+1+1+1+1+1 = 18;$$

$$n = 12.$$

As shown in FIG. 10, the set of target sections identified from the 4×3 grid of child sections comprises 9 child sections which are respectively assigned sectional weight values as 3, 3, 1, 1, 1, 1, 1, 1, and 1. The sum of sectional weight values of the set of target sections can be calculated as:

Sum of Target Sections=3+3+1+1+1+1+1+1+1=13.

Thereof, the similarity degree is calculated as:

$$\text{Similarity} = \frac{\text{Sum of Target Sections}}{\sum_{i=1}^{12} w_i} = \frac{13}{18} = 72\%.$$

As mentioned above, if the preset similarity threshold is 70%, the similarity degree 72% is more than the preset similarity threshold. As a matching result, the memo comprising the exemplary background screenshot is deployed on the displaying screen. If the preset similarity threshold is 80%, the similarity degree 72% is less than the preset similarity threshold, as a result, the memo system 400 will continue to match other screenshot-based memos onto the snapshot of the displaying screen until obtain a similarity degree corresponding to a screenshot-based memo is equal to or more than the preset similarity threshold 80% or exhaust all stored memos to stop the matching process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring, by one or more processors, a displaying screen on a computing device to determine whether the displaying screen reaches a preset trigger condition;
    capturing, by the one or more processors, a snapshot of the displaying screen in response to the displaying screen reaching the preset trigger condition;
    matching, by the one or more processors, one or more screenshots comprised in one or more screenshot-based memos and the snapshot for obtaining a similarity degree; and
    deploying, by the one or more processors, the one or more screenshot-based memos on the displaying screen in response to the similarity degree meeting a preset similarity threshold.

2. The computer-implemented method of claim 1, further comprising:
    generating, by one or more processors, the one or more screenshot-based memos.

3. The computer-implemented method of claim 2, wherein generating the one or more screenshot-based memos comprises:
    capturing, by the one or more processors, the one or more screenshots from the computing device;
    processing, by the one or more processors, the one or more screenshots for obtaining one or more background screenshots; and
    associating, by the one or more processors, one or more annotations with the one or more background screenshots to generate the one or more screenshot-based memos.

4. The computer-implemented method of claim 3, wherein the one or more annotations comprises at least one of textual type information, image type information, sounds, videos, website links, virtual keys or online applications.

5. The computer-implemented method of claim 3, wherein generating the one or more screenshot-based memos further comprises at least one of the following:
    storing, by the one or more processors, the one or more screenshot-based memos on a storage device; or
    managing, by the one or more processors, the one or more screenshot-based memos by an application interface.

6. The computer-implemented method of claim 5, wherein managing the one or more screenshot-based memos by the application interface comprises:
    editing, by the one or more processors, the one or more screenshot-based memos by the application interface;
    sorting, by the one or more processors, the one or more screenshot-based memos in accordance with the one or more background screenshots or the one or more annotations by the application interface; and archiving, by the one or more processors, the one or more memos for compressing volumes of the one or more memos by the application interface.

7. The computer-implemented method of claim 3, wherein matching the one or more screenshots comprised in the one or more screenshot-based memos and the snapshot of the displaying screen for obtaining the similarity degree comprises:

searching, by the one or more processors, at least one of the one or more background screenshots from the one or more screenshot-based memos;

splitting, by the one or more processors, the at least one of the one or more background screenshots into a plurality of child sections, wherein the plurality of child sections each is assigned with a sectional weight value in accordance with a predefined measuring rule;

mapping, by the one or more processors, the plurality of child sections onto the snapshot of the displaying screen to identify a set of target sections from the plurality of child sections, wherein the set of target sections match a corresponding part of the snapshot of the displaying screen; and calculating, by the one or more processors, the similarity degree in accordance with ratio between sum of sectional weight values of the set of target sections and sum of sectional weight values of the plurality of child sections.

8. The computer-implemented method of claim 7, wherein the predefined measuring rule comprises:

assigning, by the one or more processors, sectional weight values to the child sections comprising a matching quantity of annotations; and assigning, by the one or more processors, a higher sectional weight value to one of the child sections comprising more quantity of annotations than another one of the child sections.

9. The computer-implemented method of claim 2, wherein deploying the one or more screenshot-based memos on the displaying screen comprises:

displaying, by the one or more processors, at least one of the one or more screenshot-based memos in the displaying screen in response to the similarity degree meeting the preset similarity threshold;

highlighting, by the one or more processors, the one or more annotations associated with the one or more background screenshots comprised in the at least one of the one or more screenshot-based memos; and in response to highlighting the one or more screenshot-based annotations, displaying, by the one or more processors, other annotations in accordance with the one or more annotations.

10. The computer-implemented method of claim 1, wherein the preset trigger condition is the displaying screen reaching a time threshold, and wherein the time threshold is a preset duration time in which contents displayed on the displaying screen remain unchanged, or a preset activated instruction is received from external environment.

11. A computer system comprising:
at least one processing unit; and
a memory coupled to the at least one processing unit and storing instructions thereon, the instructions, when executed by the at least one processing unit, performing acts comprising:

monitoring a displaying screen on a computing device to determine if the displaying screen reaches a preset trigger condition;

capturing a snapshot of the displaying screen in response to the displaying screen reaching the preset trigger condition;

matching one or more screenshots comprised in one or more screenshot-based memos and the snapshot to obtain a similarity degree; and deploying the one or more screenshot-based memos on the displaying screen in response to the similarity degree meeting a preset similarity threshold.

12. The computer system of claim 11, wherein the acts further comprise:

generating the one or more screenshot-based memos.

13. The computer system of claim 12, wherein generating the one or more screenshot-based memos comprises the following:

capturing the one or more screenshots from the computing device;

processing the one or more screenshots for obtaining one or more background screenshots; and associating one or more annotations with the one or more background screenshots to generate the one or more screenshot-based memos.

14. The computer system of claim 13, wherein matching the one or more screenshots comprised in the one or more screenshot-based memos and the snapshot of the displaying screen for obtaining the similarity degree comprises:

searching at least one of the one or more background screenshots from the one or more screenshot-based memos;

splitting the at least one of the one or more background screenshots into a plurality of child sections, wherein the plurality of child sections is assigned a sectional weight value in accordance with a predefined measuring rule;

mapping the plurality of child sections onto the snapshot of the displaying screen to identify a set of target sections from the plurality of child sections, wherein the set of target sections match a corresponding part of the snapshot of the displaying screen; and calculating the similarity degree based on a ratio between a sum of sectional weight values of the set of target sections and a sum of sectional weight values of the plurality of child sections.

15. The computer system of claim 14, wherein the predefined measuring rule comprises:

assigning sectional weight values to the child sections comprising a matching quantity of annotations; and assigning a higher sectional weight value to one of the child sections comprising a greater quantity of annotations than another one of the child sections.

16. The computer system of claim 13, wherein deploying the one or more screenshot-based memos on the displaying screen comprises:

displaying at least one of the one or more screenshot-based memos in the displaying screen in response to the similarity degree meeting the preset similarity threshold;

highlighting the one or more annotations associated with the one or more background screenshots comprised in the at least one of the one or more screenshot-based memos; and in response to highlighting the one or more screenshot-based annotations, displaying other annotations in accordance with the one or more screenshot-based annotations.

17. The computer system of claim 11, wherein the preset trigger condition is the displaying screen reaching a time threshold, and wherein the time threshold is a preset duration time in which contents displayed on the displaying screen remain unchanged.

18. A computer program product, the computer program product comprising a computer readable storage medium having program instructions embodied therewith, the program instructions executable by an electronic device to cause the electronic device to perform acts comprising:

monitoring a displaying screen on a computing device for determining whether the displaying screen reaches a preset trigger condition;

capturing a snapshot of the displaying screen in response to the displaying screen reaching the preset trigger condition;

matching one or more screenshots comprised in one or more screenshot-based memos and the snapshot to obtain a similarity degree; and deploying the one or more screenshot-based memos on the displaying screen in response to the similarity degree meeting a preset similarity threshold.

19. The computer program product of claim 18, wherein the one or more screenshot-based memos are generated the following acts:

capturing the one or more screenshots from the computing device;

processing the one or more screenshots to obtain one or more background screenshots; and associating one or more annotations with the one or more background screenshots to generate the one or more screenshot-based memos.

20. The computer program product of claim 19, wherein matching the one or more screenshots comprised in the one or more screenshot-based memos and the snapshot of the displaying screen for obtaining the similarity degree comprises:

searching at least one of the one or more background screenshots from the one or more screenshot-based memos;

splitting the at least one of the one or more background screenshots into a plurality of child sections, wherein the plurality of child sections each is assigned with a sectional weight value in accordance with a predefined measuring rule;

mapping the plurality of child sections onto the snapshot of the displaying screen to identify a set of target sections from the plurality of child sections, wherein the set of target sections matches a corresponding part of the snapshot of the displaying screen; and calculating the similarity degree based on a ratio between a sum of sectional weight values of the set of target sections and a sum of sectional weight values of the plurality of child sections.

* * * * *